UNITED STATES PATENT OFFICE.

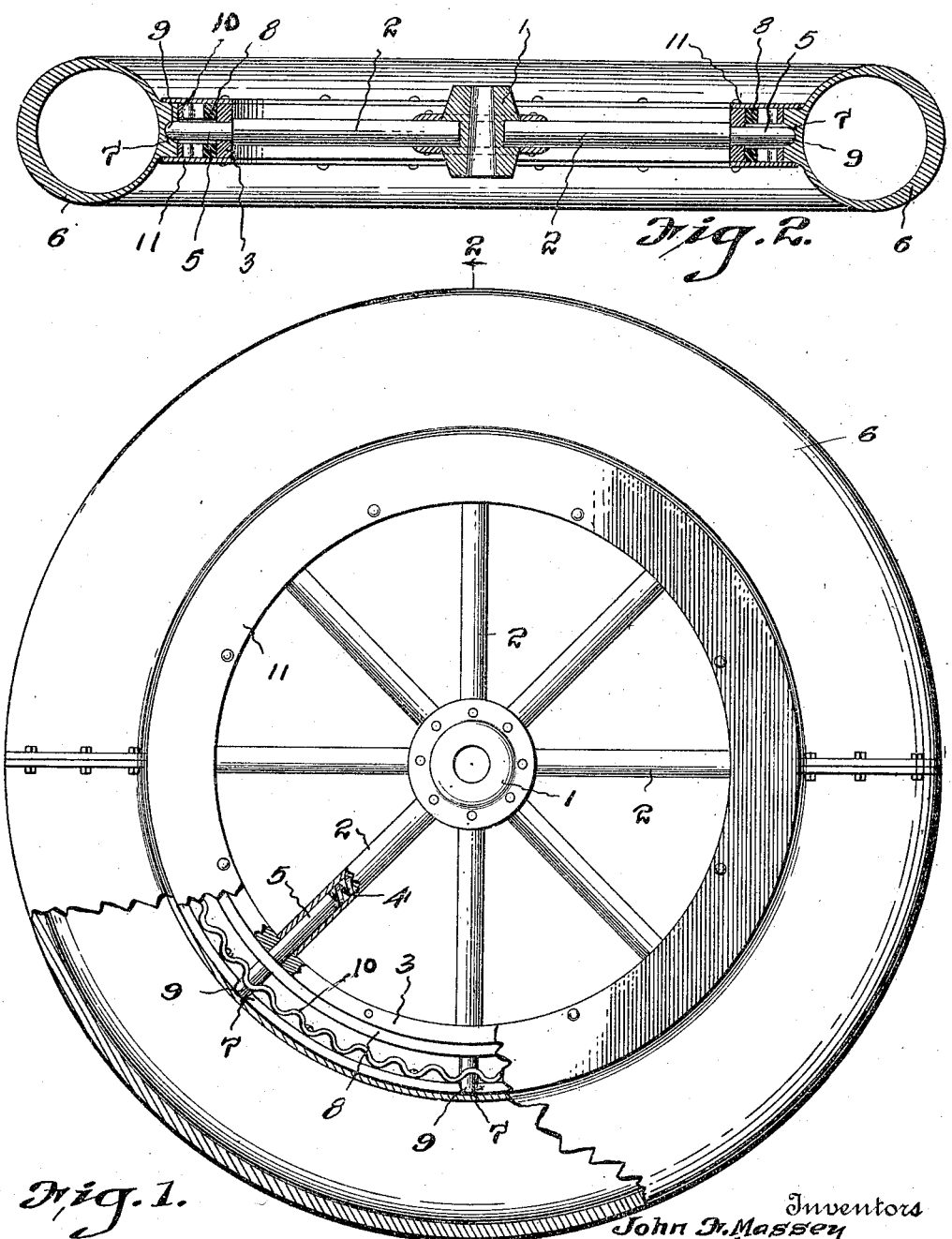

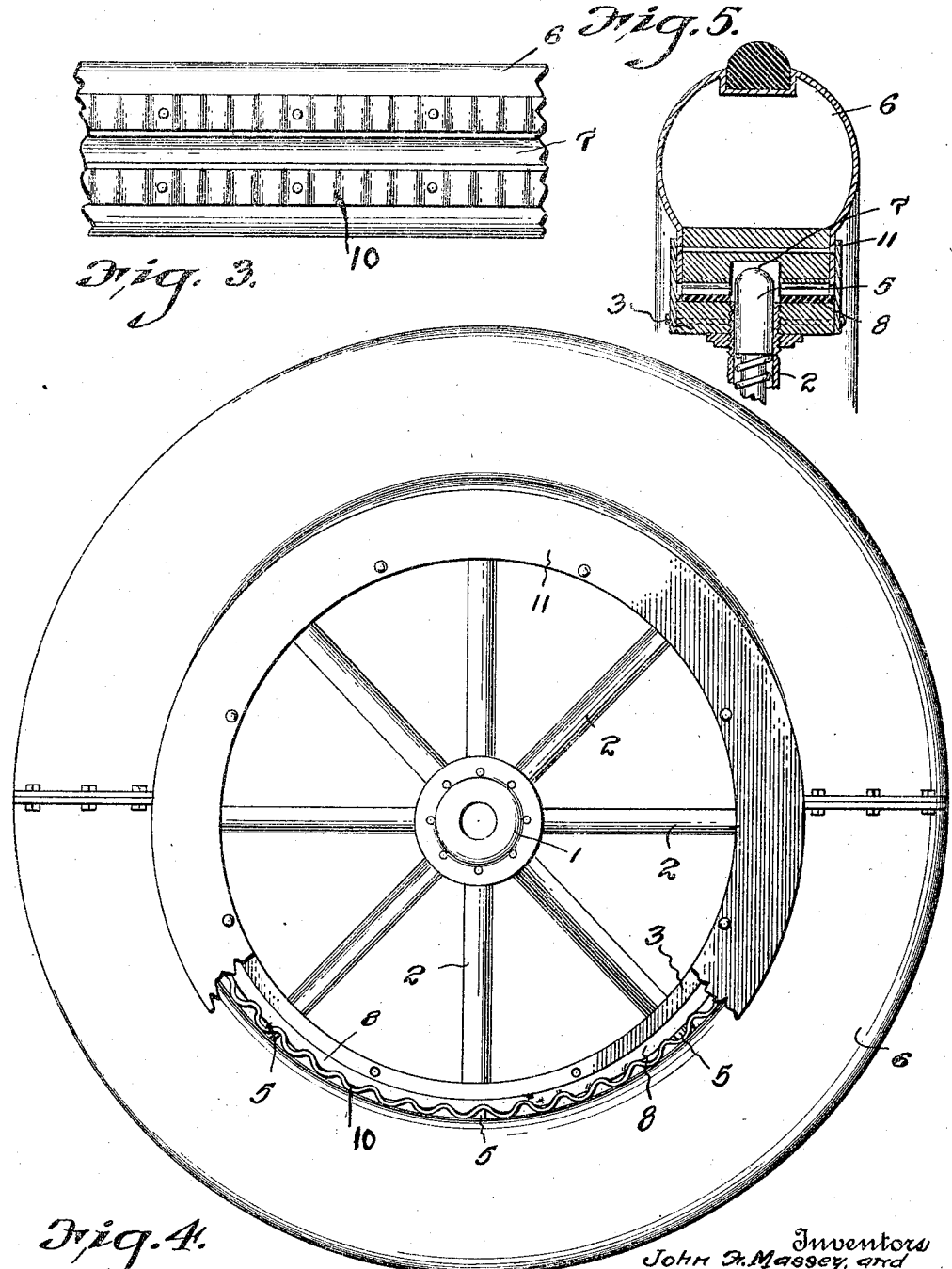

JOHN FREDERICK MASSEY AND WILLIAM W. RABENSDORF, OF FAIRCHILD, WISCONSIN.

SPRING-WHEEL.

1,290,625.  Specification of Letters Patent.  Patented Jan. 7, 1919.

Application filed July 15, 1918. Serial No. 244,977.

*To all whom it may concern:*

Be it known that we, JOHN FREDERICK MASSEY and WILLIAM W. RABENSDORF, citizens of the United States, and residents of Fairchild, in the county of Eau Claire and State of Wisconsin, have invented a new and useful Spring-Wheel, of which the following is a specification.

The object of our invention is to provide a spring wheel of improved construction which eliminates the use of pneumatic tires.

In the accompanying drawings illustrating our invention—

Figure 1 is a view partly in elevation and partly in section of our spring wheel; Fig. 2 is a section on line 2—2 of Fig. 1; Fig. 3 is a detail view of the inner portion of tire 6, showing channel 7; Fig. 4 is a view of the wheel as it appears when carrying a load, a portion of member 11 being broken away; and Fig. 5 is a section of another form of our invention.

Like numerals designate like parts in all the views.

In constructing our invention we provide a suitable hub 1 from which radiate suitable tubes 2, carrying a rim 3. Contained in the tubes 2 are suitable springs 4 which bear against plungers 5 which are slidably mounted in the tubes 2. We provide an outer steel tire 6 having a channel 7 into which the ends of plungers 5 project, said channel being of just sufficient width to accommodate the ends of the plungers and on which the plungers rest when the wheel is in use. Steel tire 6 is normally held in spaced relation to the inner rim 3 by the resiliently pressed plungers 5. Encircling the periphery of inner rim 3 we prefer to provide rubber bands 8, which may be suitably secured to the rim 3. Encircling the inner portion of the steel tire 6 we provide suitable corrugated bands 10 of metal, which are suitably secured by screws to member 6. Plungers 5 are provided with ball ends 9 to give them an easy action when pressed against the channeled portion 7 of the steel tire 6 when the wheel is in use. Our steel tire 6 is made in two semi-circular sections so that it can be readily assembled. These sections are suitably secured to each other by suitable bolts. We further provide opposite flanges or protecting strips mounted on the inner rim 3, and designated 11. These flanges or strips 11 serve to keep dirt out and are also a protection to the outer steel tire 5 when the wheel is rotating in an inclined position. It is within the contemplation of our invention to provide steel tires 6 of similar shape to the rubber tires now in general use and with a roughened traction surface.

In operation the weight of the vehicle will cause the inner rim to lightly bear against inner corrugated bands on the inner surface of the outer steel tire, the plungers at the same time resiliently resting against the channeled portion of the steel tire. The pull is obtained mostly from the plungers, but some is also obtained from the coming together of the rubber bands carried by the inner rim against the corrugated bands carried by the steel tire. The ball end of the plunger causes the device to operate smoothly without too great friction. The wheel may be made in any suitable sizes and with any desired number of tubes and plungers and with any suitable size of spring, according to the use to which the wheel is to be put.

What we claim is:

1. In a spring wheel, in combination with a hub and cushioning spoke plungers, a metal tire having an annular channeled portion of just sufficient width to accommodate the ends of the plungers on its inner surface in which the outermost end of the spoke plungers travel a plurality of annular corrugated metal bands secured to the inner surface of the metal tire adjacent the channeled portion, an inner rim member, bands of flexible material mounted on said inner rim and positioned to engage the above mentioned corrugated metal bands, and annular protecting strips carried by the inner rim and projecting over the sides of the metal tire, substantially as set forth.

2. In a spring wheel, the combination of a hub, tubes radiating from the hub, a rim mounted on the ends of the tubes, springs in the tubes, plungers pressed outwardly by the springs, the plungers having ball ends, and a channeled metal tire into the annular channeled portion of which the plungers project to afford a considerable degree of tractive effect, said channeled portion being of just sufficient width to accommodate the ends of the plungers, the ball ends of the plungers preventing too great friction.

3. In a spring wheel, in combination with a hub and spring cushioning spoke means, a metal tire comprising two semicircular sections and means for securing the sections together, said tire having an annular channeled portion on its inner surface shaped to provide a bearing surface for the spring cushioning spoke means, bands of corrugated metal arranged adjacent the channeled portion on the inner surface of said tire, an inner tire member carried by the spring cushioning spoke means, spaced annular flexible bands mounted on said inner tire and positioned to engage the above mentioned corrugated metal bands to operate in conjunction with the spring cushioning spoke means to give the necessary pull on the outer tire as the spoke elements engage the channeled portion of the outer tire and the flexible bands engage the corrugated metal bands under the weight of the vehicle, substantially as set forth.

JOHN FREDERICK MASSEY.
WILLIAM W. RABENSDORF.

Copies of this patent may be obtained for five cents each, by addressing the "Commissioner of Patents, Washington, D. C."